(12) United States Patent
Ferretti et al.

(10) Patent No.: US 9,045,037 B2
(45) Date of Patent: Jun. 2, 2015

(54) VENTILATION ASSEMBLY

(75) Inventors: Fabrizio Ferretti, Asti (IT); Alessandro Pivato, Asti (IT)

(73) Assignee: GATE S.R.L., Turin (IT)

(*) Notice: Subject to any disclaimer, the term of this patent is extended or adjusted under 35 U.S.C. 154(b) by 538 days.

(21) Appl. No.: 13/357,896

(22) Filed: Jan. 25, 2012

(65) Prior Publication Data

US 2012/0189440 A1    Jul. 26, 2012

(30) Foreign Application Priority Data

Jan. 25, 2011  (IT) .............................. TO2011A0056

(51) Int. Cl.
| | |
|---|---|
| F04D 25/08 | (2006.01) |
| B60K 11/02 | (2006.01) |
| F04D 25/06 | (2006.01) |
| F01P 5/02 | (2006.01) |
| F28F 9/00 | (2006.01) |
| B60K 11/04 | (2006.01) |
| F28D 21/00 | (2006.01) |

(52) U.S. Cl.
CPC .............. B60K 11/02 (2013.01); F04D 25/064 (2013.01); F04D 25/0646 (2013.01); B60K 11/04 (2013.01); F01P 5/02 (2013.01); F01P 2070/50 (2013.01); F04D 25/082 (2013.01); F28D 2021/0094 (2013.01); F28F 9/002 (2013.01)

(58) Field of Classification Search
CPC .............. F04D 19/002; F04D 25/0646; F04D 29/5806; F04D 25/082; F01P 2070/50; F01P 5/02; F28D 9/002; F28D 2021/0094; B60K 11/02; B60K 11/04
USPC ....................................... 417/352–354, 423.9
See application file for complete search history.

(56) References Cited

U.S. PATENT DOCUMENTS

| | | | |
|---|---|---|---|
| 6,616,422 B2* | 9/2003 | Hsieh ............................ | 417/354 |
| 2009/0142203 A1* | 6/2009 | De Filippis et al. .......... | 417/353 |

* cited by examiner

*Primary Examiner* — Charles Freay
*Assistant Examiner* — Philip Stimpert
(74) *Attorney, Agent, or Firm* — Muncy, Geissler, Olds & Lowe, P.C.

(57) ABSTRACT

A ventilation assembly has a support structure, an electric motor and a fan connected to the motor. The fan has a cup-like hub with an annular side wall and a bottom wall and which define internally a housing in which the motor extends. The hub further has a plurality of internal vanes for the ventilation of the motor, that extend from the side wall of the hub. The support structure has at least one arcuate formation which is coaxial with the axis of the fan and which extends axially inside the hub of the fan, in a partially interpenetrated relationship with the side wall of the hub to form a labyrinth-like radial path between external and internal regions with respect to the hub.

3 Claims, 4 Drawing Sheets

VENTILATION ASSEMBLY

CROSS REFERENCE TO RELATED APPLICATIONS

This non-provisional patent application claims priority under 35 U.S.C. §119(a) from Patent Application No. TO 2011 A 000056 filed in Italy on Jan. 25, 2011.

FIELD OF THE INVENTION

This invention relates to a ventilation assembly and in particular, to a ventilation assembly for a heat exchanger of a motor vehicle, for example, a radiator.

BACKGROUND OF THE INVENTION

More specifically, the invention relates to a ventilation assembly of the type comprising: a support structure or cowl, in which a main flow opening is constructed and which comprises a plurality of struts which extend near the opening as far as a central support structure, preferably of annular shape; and a motorized ventilator including an electric driving motor which is connected to the central support structure and a fan of the axial type which is connected to the motor and which is mounted for rotation in the main flow opening; the fan comprising a plurality of vanes which extend from a cup-like hub which has an annular side wall and a bottom wall and which defines internally a housing in which the associated motor extends; the hub further having a plurality of internal vanes for the ventilation of the motor which extend from the side wall of that hub.

SUMMARY OF THE INVENTION

There is a desire for an improved ventilation assembly so as to ensure a higher degree of protection of the electric motor from any external agents, such as water, which are capable of becoming introduced inside the hub of the impeller, while simultaneously allowing effective cooling of the electric motor.

Accordingly, in one aspect thereof, the present invention provides a ventilation assembly comprising: support structure, in which there is constructed a main flow opening and which comprises a plurality of struts which extend near the opening as far as a central support structure, preferably of annular shape; a motorized ventilator including: an electric motor connected to the central support structure; and a fan which is connected to the motor and which is mounted for rotation in the main opening or passage, the fan comprising a plurality of vanes which extend from a cup-like hub which has an annular side wall and a bottom wall and which defines internally a housing in which the motor extends; the hub further having a plurality of internal vanes for the ventilation of the motor, that extend from the side wall of the hub, wherein the central support structure has at least one arcuate formation which is coaxial with the axis of the fan and which extends axially inside the hub of the fan, in a partially interpenetrated relationship with the side wall of the hub in such a manner that a labyrinth-like radial path is defined between the external region and the internal region with respect to the hub.

Preferably, the radially outermost portions of the inner vanes of the hub of the fan have respective notches which are circumferentially aligned with each other about the axis of the fan, and the at least one arcuate formation of the central support structure extend(s) into the hub of the fan inside the notches.

Preferably, the central support structure has at least one additional, radially more external arcuate formation, which extends axially outside the hub of the fan, in a partially interpenetrated relationship with the side wall of the hub.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
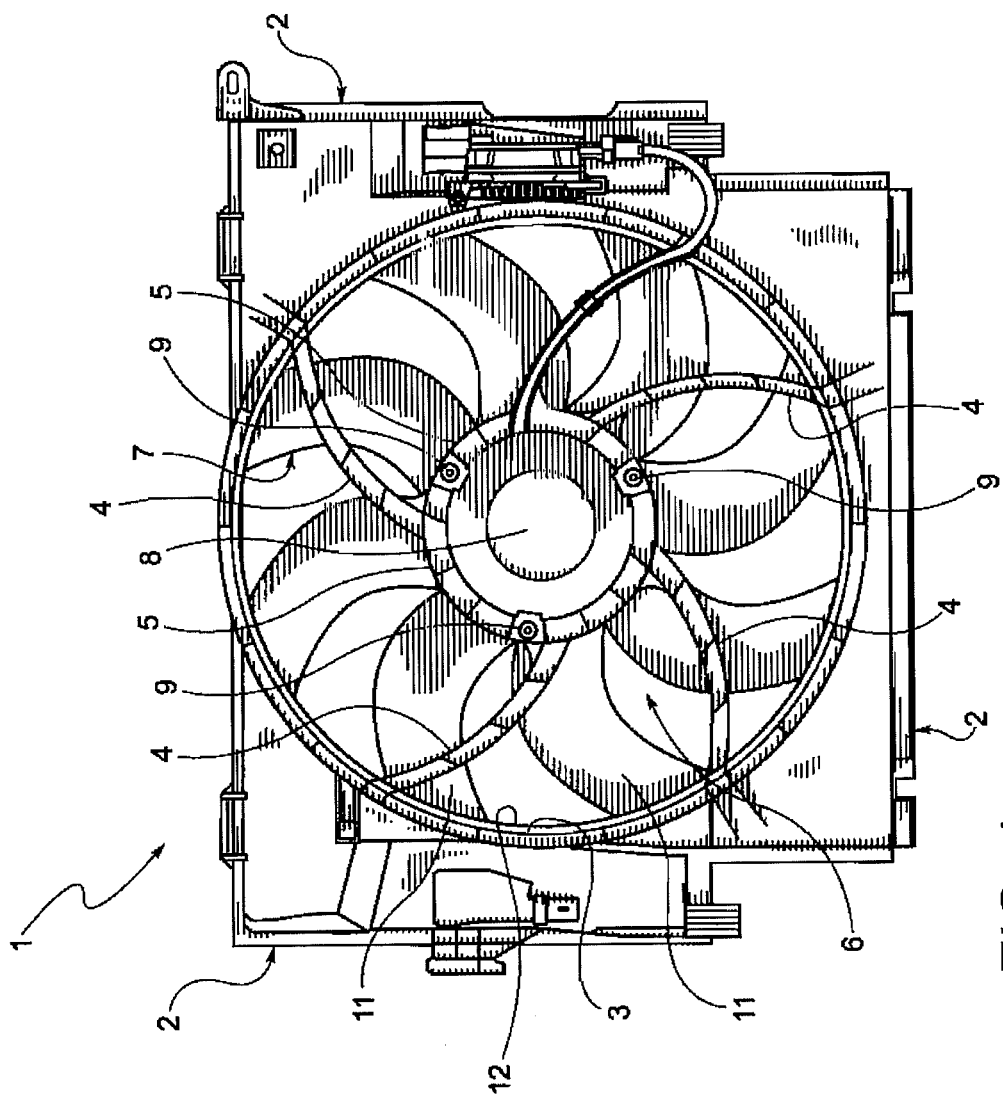
FIG. 1 is a front view of a ventilation assembly according to the present invention.
Figure 2:
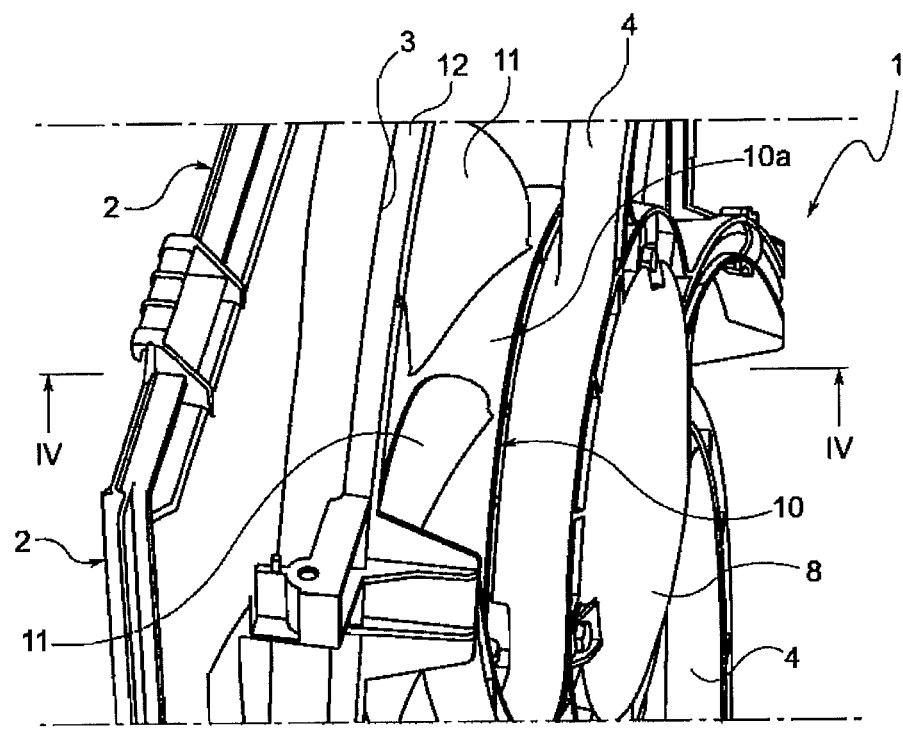
FIG. 2 is a partial perspective view of the ventilation assembly according to FIG. 1.

In the drawings, there is generally designated 1 a ventilation assembly according to the present invention for at least one heat exchanger, for example a radiator, of a motor vehicle provided with an internal-combustion engine. Such a ventilation assembly is also known as a cooling fan module.

The ventilation assembly 1 comprises a support structure 2 in the form of a cowl which is substantially plate-like and constructed, for example, from molded plastics material. The support structure 2 defines a main flow opening 3 which may be in the form of a passage through the support structure.

As can be seen in particular in FIG. 1, a plurality of arcuate struts 4 which are advantageously integral with the support structure 2, as a monolithic structure, extend from the peripheral edge of the opening 3 towards the centre of the opening.

The radially innermost ends of the struts 4 are connected to an annular central support structure 5 which is advantageously integral therewith, preferably as a monolithic structure.

The ventilation assembly 1 further comprises a motorized ventilator which is generally designated 6. The motorized ventilator 6 comprises a fan or vaned impeller 7 which is mounted for rotation in the main flow opening 3 and an associated electric motor 8 which is fixed to the ring 5, for example, by means of a plurality of screws 9.

In a manner known per se, the impeller or fan 7 comprises a central hub 10 (FIG. 4) which is substantially of cup-like form and which has an annular side wall 10a and a bottom wall 10b. A plurality of arcuate vanes 11, which preferably have the distal ends connected to a peripheral ring 12, extend from the outer surface of the hub 10. In a manner known per se and not illustrated in the drawings, the hub 10 of the fan 7 is connected to the shaft of the electric motor 8.

The hub 10 of the fan 7 internally defines a housing 13 (FIG. 4) in which the associated motor 8 partially extends. The hub 10 further has a plurality of internal vanes 14 (FIG. 4) which extend from the annular side wall 10a thereof for the ventilation of the motor 8.

Figure 3:
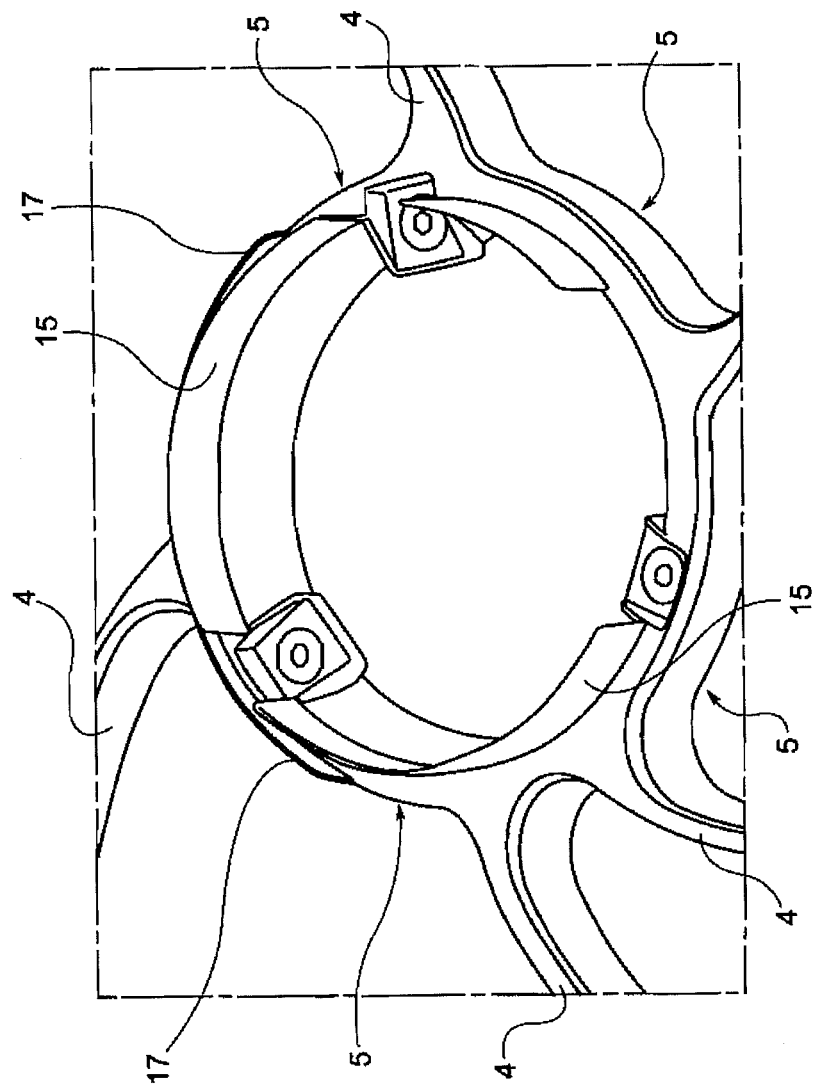
FIG. 3 is a partial perspective view showing an annular central support structure of the ventilation assembly of FIG. 1.
Figure 4:
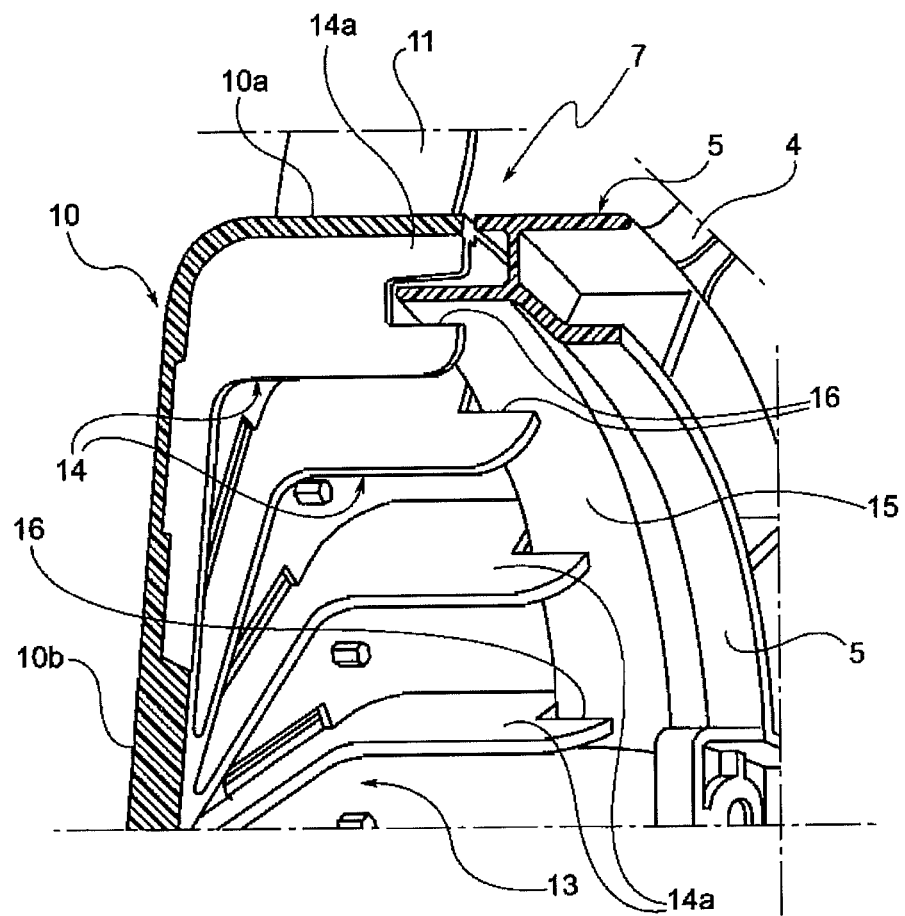
FIG. 4 is a sectional view taken along the line IV-IV of FIG. 2 of a portion of the hub and central support structure.

With particular reference to FIGS. 3 and 4, the annular central support structure 5 has at least one and preferably a plurality of arcuate formation(s) 15 which are integral therewith and which extend axially inside the hub 10 of the fan 7, in a relationship axially interpenetrated with the side wall 10*a* of that hub (FIG. 4).

The arrangement is such that there is defined between the external region and the internal region with respect to the hub 10, a labyrinth-like course or path which is capable of impeding the introduction of extraneous agents, such as splashes of water, dirt, etc., into the housing 13 where the motor of the fan is arranged. The labyrinth-like course is further capable of allowing an easy flow of air from the outer side to the inner side of the hub in order to cool the motor.

Preferably, the radially outermost portions 14*a* of the inner vanes 14 of the fan 7 have notches 16 which are circumferentially aligned about the axis of the fan. The arcuate formation(s) 15 of the annular central support structure 5 extend(s) into the hub 10 of the fan 7, inside the notches 16, as shown in FIG. 4.

With reference to FIG. 3, in addition to the at least one projecting arcuate formation 15, the annular central support structure 5 may be provided with at least one additional arcuate formation, such as the one designated 17 in FIG. 3, which is radially more external and which is intended to extend radially outside the side wall 10*a* of the hub 10 of the fan. Thus, the radial labyrinth-like course defined between external and internal regions with respect to the hub 10, is even more "tortuous".

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A ventilation assembly comprising:
a support structure, in which there is constructed a main flow opening and which comprises a plurality of struts which extend near the opening as far as a central support structure; and
a motorized ventilator including:
an electric motor connected to the central support structure; and
a fan which is connected to the motor and which is mounted for rotation in the main flow opening, the fan comprising a plurality of vanes which extend from a cup-like hub which has an annular side wall and a bottom wall and which defines internally a housing in which the motor extends; the hub further having a plurality of internal vanes for the ventilation of the motor, that extend from the side wall of the hub,
wherein the central support structure has at least one arcuate formation which is coaxial with an axis of the fan and which extends axially inside the hub of the fan, in a partially interpenetrated relationship with the side wall of the hub in such a manner that a labyrinth-like radial path is defined between an external region and an internal region with respect to the hub,
wherein the radially outermost portions of the inner vanes of the hub of the fan have respective notches which are circumferentially aligned with each other about the axis of the fan, and the at least one arcuate formation of the central support structure extend(s) into the hub of the fan inside the notches.

2. The assembly of claim 1, wherein the central support structure has at least one additional, radially more external arcuate formation, which extends axially outside the hub of the fan, in a partially interpenetrated relationship with the side wall of the hub.

3. A ventilation assembly comprising:
a support structure, in which there is constructed a main flow opening and which comprises a plurality of struts which extend near the opening as far as a central support structure; and
a motorized ventilator incuding:
an electric motor connected to the central support structure; and
a fan which is connected to the motor and which is mounted for rotation in the main flow opening, the fan comprising a plurality of vanes which extend from a cup-like hub which has an annular side wall and a bottom wall and which defines internally a housing in which the motor extends; the hub further having a plurality of internal vanes for the ventilation of the motor, that extend from the side wall of the hub,
wherein the central support structure has at least one arcuate formation which is coaxial with an axis of the fan and which extends axially inside the hub of the fan, in a partially interpenetrated relationship with the side wall of the hub in such a manner that a labyrinth-like radial path is defined between an external region and an internal region with respect to the hub,
wherein the central support structure has at least one additional, radially more external arcuate formation, which extends axially outside the hub of the fan, in a partially interpenetrated relationship with the side wall of the hub.

* * * * *